Patented Apr. 26, 1938

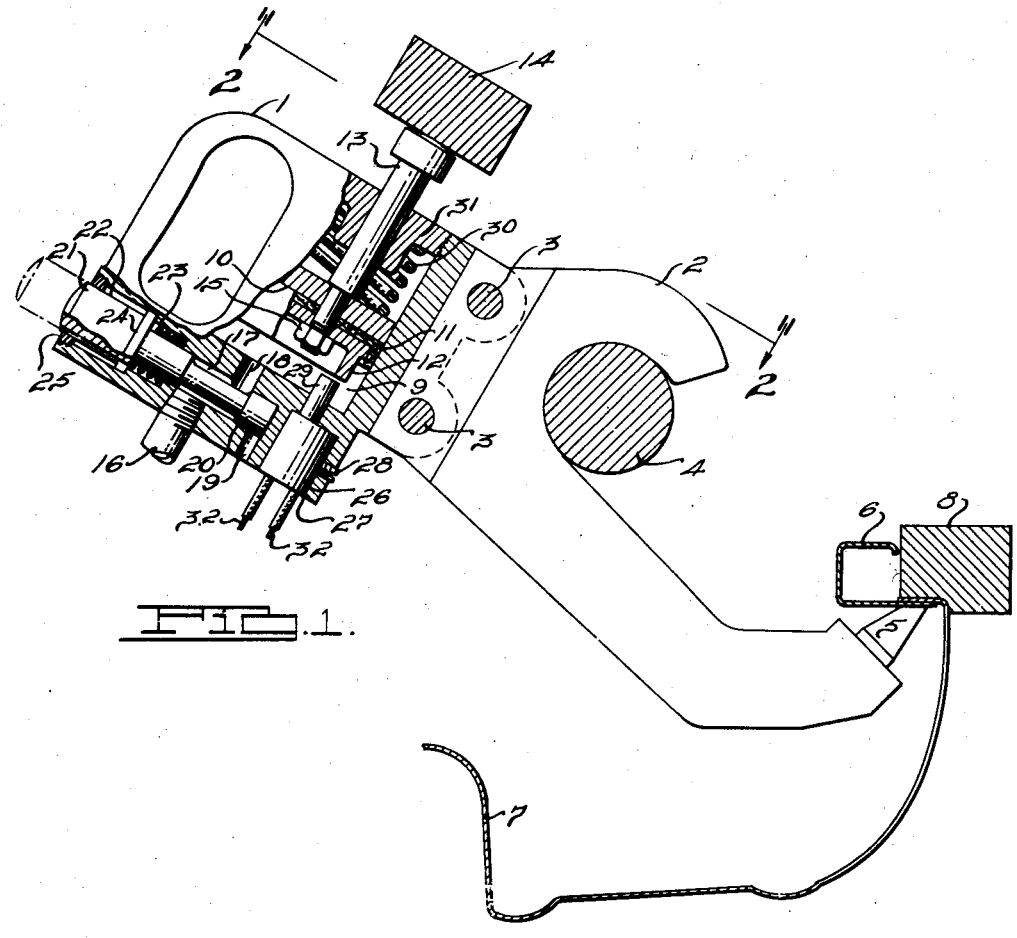

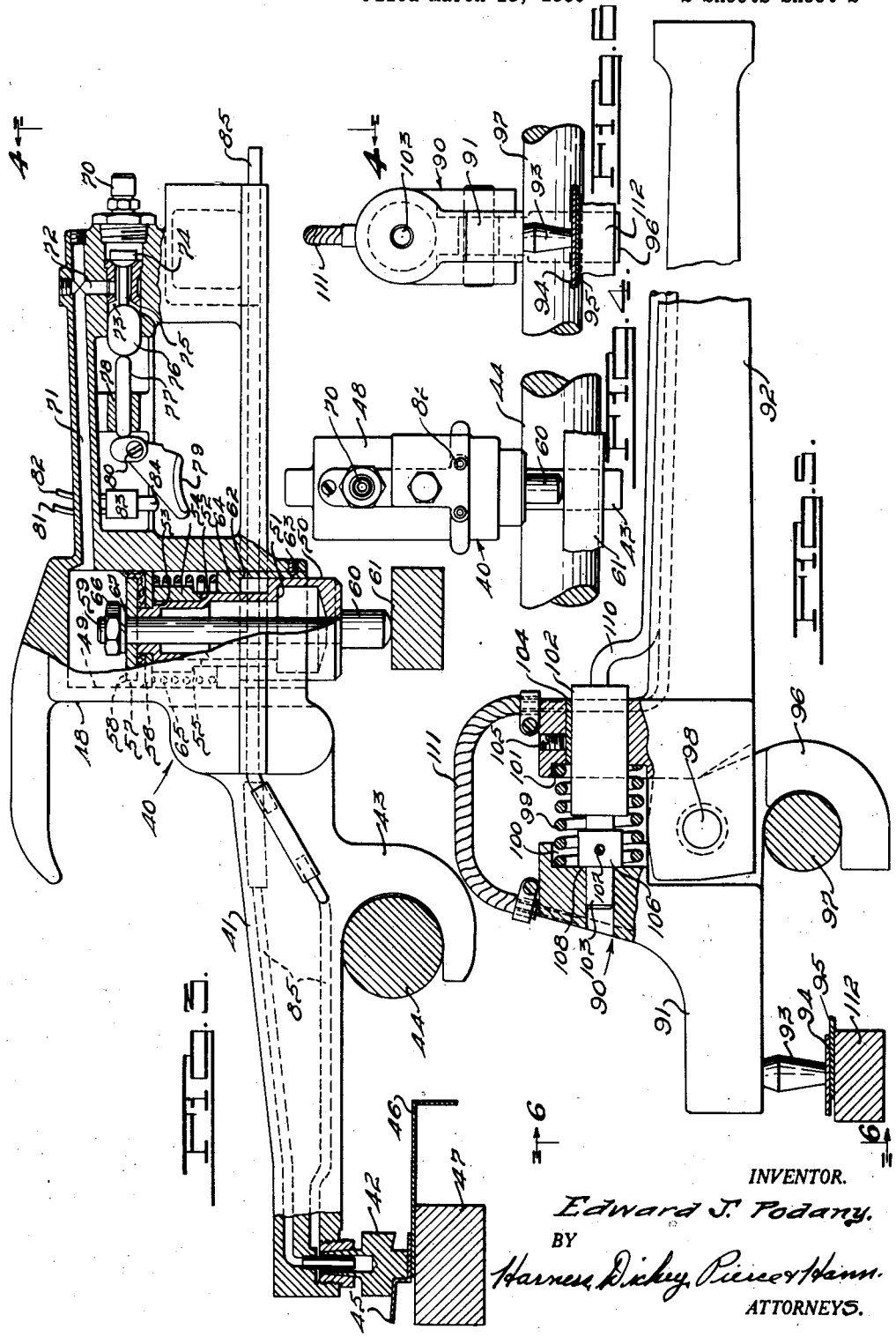

2,115,084

UNITED STATES PATENT OFFICE 2,115,084

ELECTRIC WELDING APPARATUS

Edward J. Podany, Detroit, Mich., assignor to The Murray Corporation of America, a corporation of Delaware Application March 18, 1935, Serial No. 11,537

7 Claims. (Cl. 219—4)

The present invention relates to welding tools and particularly to such tools as are usually referred to as of the pry bar type.

In many lines of manufacture in which electric welding is employed in the factory assembly of parts, and of which the automobile industry is an example, the parts to be welded are clamped together upon a jig, which forms one terminal of the welding circuit. A member stationarily mounted with respect to the jig forms the other terminal of the welding circuit. A tool commonly referred to as a "welding gun", is provided with a welding electrode for engaging the work material at the point to be welded, and is used to complete the circuit between the work material and the above mentioned stationary second terminal. Frequently, the welding gun is provided with a clamplike part which may partially surround the second terminal so that the operator may use the second terminal as a pry to force the electrode into positive engagement with the work to be welded. Welding guns of this character are also commonly provided with hand switches, actuatable by the operator after he has brought the tool into engagement with the work, to control remote control mechanism which initiates the flow of welding current.

Difficulty has been experienced in the use of welding guns of this character for the reason that the operator is relied upon to engage the work with the proper pressure, and to accomplish this before the flow of welding current is initiated. Through carelessness or fatigue, the welding pressures thus obtained vary considerably among the several welds, thus introducing irregular welding action. Frequently also, the flow of welding current is initiated too soon, causing burning of the work as well as of the electrodes.

In accordance with the present invention, means are incorporated into the welding gun to insure consistent contact pressures for each welding operation and to insure that this proper contact pressure is attained before the welding action is begun. In the illustrated embodiments, this mechanism responds to a press button formed integrally with the welding gun. In the operation of a welding gun organized in accordance with the present invention, the welding gun is placed upon the work to be welded and against the previously mentioned prying member, which may also constitute the second terminal of the welding circuit. Upon operation of the press button, the gun is first pried into engagement with the piece to be welded with a predetermined force, and thereafter the welding circuit is completed.

Any desired means may be employed to interrupt the flow of welding current upon completion of the weld. Preferably, however, an arrangement such as disclosed in the co-pending application of Orin J. Ryder, Serial No. 742,921, filed September 6, 1934, and assigned to the same assignee as the present invention, is employed. As described therein, the welding circuit is controlled by means of a relay, which may respond to the above mentioned press button, and which, upon operation, completes the welding circuit and maintains it complete for a predetermined length of time. Upon interruption of the welding circuit by this relay, recompletion thereof is prevented unless the relay solenoid is de-energized and then again energized.

The principal object of the present invention, accordingly, is to provide a welding gun of the pry bar type which embodies automatic means to insure a proper contact pressure and to insure that the flow of welding current is not initiated until after such proper contact pressure has been obtained. It is also an object of the present invention to provide a welding gun having the above characteristics, which is simple in construction, positive in operation, and which may be economically manufactured. Other objects and advantages of the present invention appear in the following description and in the following claims.

In the drawings:

Figure 1 is a view in side elevation, partly in section, of a pry bar welding gun embodying the present invention, Fig. 2 is a view taken on the line 2—2 of Fig. 1, Fig. 3 is a view in side elevation, partly in section, of a modified form of gun embodying the present invention, Fig. 4 is a view taken on the line 4—4 of Fig. 3, Fig. 5 is a view in side elevation, partly in section, of a second modification of the present invention, and Fig. 6 is a view taken on the line 6—6 of Fig. 5.

Referring to Figs. 1 and 2, the welding gun comprises, generally, a housing 1 formed in the shape of a handle grip, to which an electrode portion 2 is removably mounted by bolts 3. Member 2 is formed to partially surround a prying member 4 which, as previously mentioned, preferably constitutes one terminal of the welding supply circuit, and terminates in an electrode 5, illustrated as bearing against two pieces 6 and 7 which represent the work to be welded. Pieces 6 and 7 may be mounted on a jig 8 which, as previously mentioned, forms the other terminal of the welding supply circuit. It will be understood that in general practice, pry 4 and jig 8 extend at right angles to the plane of the paper and that the pieces to be welded, such as pieces 6 and 7, are attached to jig 8 at various points along its length by suitable clamps (not shown). With this arrangement, the welding gun may be advanced from one welding position to another along members 4 and 8.

Housing 1 is hollowed out to form a piston cylinder 9, which receives a piston 10. A plunger 13, disposed to bear against a member 14 to produce the proper welding pressure, passes through piston 10, packing gland 11 and packing cup 12 and is secured thereto by nut 15. It will be understood that support 14 extends along pry 4 and jig 8 and may be formed integrally with either of these members.

Chamber 9 communicates with a source of air pressure 16 through intake ports 17 and 18. Port 18 and a suitable exhaust port 19 are controlled by a valve 20 formed at the end of press button 21. Press button 21 fits into a circular recess formed in the end of housing 1 and normally occupies the dotted line position under the influence of spring 23 which forces shoulder 24 against stop 25. Stop 25 may be threaded into housing 1. Switch 26, secured in a recess 27 by means of set screw 28, may be of usual construction and preferably comprises suitable contact structure which responds to a plunger 29. The arrangement is preferably such that the contacts are closed when plunger 29 occupies the illustrated extreme position and are open upon inward movement of plunger 29. Switch 26 may also comprise a spring (not shown) to bias plunger 29 to the illustrated position.

In operation, the welding gun is placed in the illustrated position, and button 21 is moved to the full line position, in which valve 20 closes exhaust port 19 and connects intake port 18 to the source of supply 16. The consequent flow of air into cylinder 9 forces piston 10 to the illustrated position against the force of spring 30, which bears against a seat 31 threaded into housing 1. The movement of piston 10 forces plunger 13 into engagement with stop 14, which action tends to rotate the gun around member 4 and forces electrode 5 firmly into engagement with the pieces to be welded.

As piston 10 reaches the end of its movement, plunger 29 reaches contact closing position, interconnecting conductors 32. It will be understood that conductors 32 control the operating circuit of switch mechanism (not shown) which, upon actuation, connects jig 8 and member 4 to the source of welding current. As mentioned, the switch mechanism preferably embodies the arrangement shown in the previously mentioned Ryder application, so that after the expiration of a predetermined interval, the welding circuit is interrupted. Alternatively, of course, independent manually operated means may be employed to interrupt the welding circuit.

Upon completion of the welding operation and interruption of the welding circuit, button 21 may be released and allowed to resume the dotted line position, as influenced by spring 23. This action moves valve 20 to the left in Fig. 1, closing port 17 and connecting port 18 to exhaust port 19. Accordingly, plunger 13 moves somewhat away from surface 14 under the influence of spring 30. In the course of this movement, plunger 29 is actuated to disconnect the conductors 32 from each other.

The modification illustrated in Figs. 3 and 4 comprises an arrangement in which a plunger for obtaining proper contact pressure, and a switch for initiating the flow of welding current, are controlled independently and in proper sequence by means of a manually controlled member associated with the gun and which, as illustrated, takes the form of a trigger. In accordance with this modification also, upon release of the trigger, the welding supply circuit is first interrupted and thereafter the contact pressure is relieved.

Referring to Figs. 3 and 4, welding gun 40 comprises a shank 41 which terminates in an electrode 42 and includes a portion 43 formed to partially surround a prying member 44. Electrode 42 bears against the work pieces 45 and 46 which, in turn, are associated with jig 47. Jig 47 and member 44 constitute the two terminals of a welding circuit, described in connection with Fig. 1.

Housing section 48 formed to provide a convenient hand grip, is hollowed out to provide a cylindrical piston chamber 49, which receives a piston assembly. The piston assembly comprises a cored out casting 50 of cylindrical cross section having outer shoulders 51, 52 and 53 formed thereon, a sleeve 54 provided with an annular shoulder 55, a piston head 56, packing gland 57 and cooperating packing cup 58, and an assembly bolt 59 which terminates in an enlarged plunger section 60 disposed to cooperate with a support 61.

A sleeve 62 forms a journal for the enlarged portion of member 50 and is provided with an annular shoulder 64, which cooperates with shoulder 51 to limit the motion of the piston assembly in one direction and with shoulder 55 to limit the motion of the piston assembly in the other direction. A biasing spring 65 tends to force the piston assembly into the chamber 49.

The above described parts may be assembled as follows: Sleeve 62 is slid upon member 50 to the position indicated; after which sleeve 54, spring 65, piston head 56, packing gland 57 and packing cup 58 may be applied and the assembly completed by nut 66 and lock washer 67. The completed assembly may then be inserted in chamber 49 and sleeve 62 secured in place therein by means of a set screw 63.

Chamber 49 communicates with a source of air pressure 70 through ports 71, 72 and 73 and valve 74, or with an exhaust port 75 through the same ports and ball valve 76. Valves 74 and 76 are both controlled by a plunger 77 journaled at 78. Plunger 77 is biased to the illustrated position by the pressure exerted on the end of valve 74, and is actuable by trigger 79, rotatably mounted on pin 80.

Conductors 81 and 82 enter a cylinder switch 83 having a contact controlling plunger 84, and is preferably of the type described in connection with Fig. 1.

Upon rotation of trigger 79 in a clockwise direction, plunger 77 forces ball valve 76 to the right, closing exhaust port 75, and forces valve 74 to the right, connecting chamber 49 to source 70. This action forces plunger 60 into engagement with support 61 with a force determined by the pressure in line 70. Upon continued movement of trigger 79, plunger 84 actuates switch 83 to circuit closing position, connecting conductors 81 and 82 together. As described in connection with Fig. 1, this action connects jig 47 and pry 44 to a source of welding current. In the absence of timing mechanism such, for example, as is described in the previously mentioned Ryder application, the welding action continues as long as trigger 79 is maintained in the actuated position.

Upon release of trigger 79, plunger 84 first reopens the circuit between conductors 81 and 82. As the movement of trigger 79 continues, valve 74 resumes the illustrated position, disconnecting chamber 49 from supply line 70, and valve 75 connects chamber 49 to exhaust port 75. This action reduces the pressure in chamber 49, permitting spring 65 to move plunger 60 somewhat away from support 61, relieving the pressure between electrode 42 and members 45 and 46.

As also illustrated in Figs. 3 and 4, gun 40 may be arranged to accommodate water line 85, which may be connected to a suitable water circulating system to provide a cooling agent for electrode 42.

Referring to Figs. 5 and 6, a pry bar welding gun is illustrated of the type in which the contact pressure is manually applied, but in which a flow of welding current is prevented until the contact pressure reaches a predetermined value.

In Figs. 5 and 6, gun 90 includes two pivotally related sections 91 and 92. Section 91 is provided with an electrode 93 which engages work pieces 94 and 95, and a curved portion 96 which partially surrounds pry 97. One end of section 92 is formed as an operator's handle, and the other end is formed as a bifurcated yoke in which section 91 is pivotally mounted by means of pin 98. A biasing spring 99 is mounted in cylindrical recesses 100 and 101 formed in sections 91 and 92, respectively, and tends to maintain the parts in the illustrated relative positions. A switch comprising housing 102 and piston 103 is provided with suitable contact structure (not shown) to control the welding current supply circuit. Housing 102 is fitted into a recess 104 formed in member 92 and is secured therein by means of a set screw 105. Piston 103 is provided with a shoulder portion 106, secured thereon by means of a set screw 107, which bears against a cooperating shoulder 108 formed in portion 91. Plunger 103 fits somewhat loosely into housing 102 to accommodate the angular displacement which occurs between these members in the operation of the gun and is arranged to close the circuit between two conductors (not shown), carried in cable 110, in the manner described in connection with Fig. 1.

If desired, electrode 93 may be provided with a water cooling system of the type shown in Fig. 3, a flexible conduit 111 being illustrated as a convenient means for conducting the water supply between the relatively movable members 91 and 92.

To effect a welding operation, handle 92 is swung in a counter-clockwise direction about pivot 98. This action compresses spring 99, forcing electrode 93 into contact with work pieces 94 and 95 with a force determined by the spring characteristics, and also moves plunger 103 further into housing 102.

Upon movement of plunger 103 into housing 102 to a predetermined degree, the contact which interconnects the supply circuit conductors is completed, and causes switching mechanism (not shown) to connect jig 112 and pry 97 to a source of welding current in the manner described in connection with Fig. 1. This action occurs only after compression of spring 99 to a predetermined degree corresponding to the desired welding contact pressure.

If the welding current supply circuit is entirely under the control of the circuit controlled by switch 102, it will be understood that the welding action will continue as long as arm 92 is held in the just described rotated position, and will be stopped if arm 92 is released to the illustrated position, or is released far enough to reduce the welding contact pressure below the predetermined value. Preferably, however, the welding current supply circuit embodies timing mechanism of the type illustrated in the above mentioned Ryder application, so that the welding current supply is automatically cut off at the end of a predetermined welding interval. In this event, release of arm 92 serves merely the purpose of permitting welding gun 90 to be moved to the next welding point.

Although specific embodiments of the present invention have been herein illustrated and described, it is evident that various modifications may be made in the construction and arrangement of parts without departing from the spirit and scope of the present invention. It is to be understood, accordingly, that the described embodiments are to be considered in an illustrative, and not in a limiting sense.

What is claimed is:

1. In an electric welding gun of the pry bar type, in which a support is provided to pry an electrode formed on the gun into engagement with the work to be welded, the combination of a member embodied in said gun for cooperation with said support; a second member embodied in said gun and disposed between said electrode and said first member for cooperation with an additional support to form a fulcrum for said gun; and means for moving said first member relative to said gun to rotate said gun about said fulcrum to establish a predetermined welding pressure.

2. In an electric welding gun of the pry bar type, in which a support is provided to pry the electrode formed on the gun into engagement with the work to be welded, the combination of a member embodied in said gun for cooperation with said support; a second member embodied in said gun and disposed between said electrode and said first member for cooperation with an additional support to form a fulcrum for said gun; contact mechanism embodied in said said gun for controlling the welding current supply; and means for moving said first member to rotate said gun about said fulcrum and for actuating said contact mechanism.

3. In an electric welding gun of the pry bar type, in which a first support is provided to pry an electrode formed on the gun into engagement with the work to be welded, the combination of a member embodied in said gun for cooperation with said support; a second member embodied in said gun for cooperation with a second support to form a support for said gun; and means for moving said first member relative to said gun to force said gun into engagement with said work and said first and second supports and establish a predetermined welding pressure between said electrode and said work.

4. In an electric welding gun of the pry bar type, in which a first support is provided to pry an electrode formed on the gun into engagement with the work to be welded, the combination of a longitudinally extending gun body; a hand grip portion formed adjacent one end of said body; means adjacent the other end of said body for accommodating said electrode; a plunger mounted in said gun for movement transversely to the axis of said body into engagement with said first support; a second member embodied in said body for cooperation with a second support to form a support for said gun; and means for actuating said plunger to force said gun into engagement with said work and first and second supports and establish a predetermined welding pressure between said electrode and said work.

5. In an electric welding gun of the pry bar type, in which a support is provided to pry an electrode formed on the gun into engagement with the work to be welded, the combination of a longitudinally extending gun body; a hand grip portion formed adjacent one end of said body; means adjacent the other end of said body to support said electrode; a plunger embodied in said gun adjacent said hand grip portion and movable transversely thereof for cooperation with said support; a hook-like member positioned intermediate said electrode and said plunger adapted to have fulcruming relation with an additional support for said gun; and means for actuating said plunger to cause said gun to rotate about said additional support and establish a predetermined welding pressure.

6. In an electric welding gun of the pry bar type, in which a support is provided to pry an electrode formed on the gun into engagement with the work to be welded, the combination of a hand grip portion and an electrode arm projecting from said hand grip portion, said electrode portion being adapted to support said electrode adjacent the remote end thereof; a plunger embodied in said hand grip portion and adapted for cooperation with said support; a hook-like member embodied in said electrode portion and adapted to cooperate with a supply busbar to supply said electrode and to form a fulcrum for said gun; and means for actuating said plunger to cause said gun to rotate about said busbar and establish a predetermined welding pressure.

7. In an electric welding gun of the pry bar type, in which a support is provided to pry an electrode formed on the gun into engagement with the work to be welded, the combination of a hand grip portion; an electrode arm extending in one direction from said hand grip portion and adapted to support said electrode adjacent the remote end thereof; an actuating portion extending in another direction from said hand grip portion; a plunger embodied in said hand grip portion and adapted to cooperate with said support; a hook-like member embodied in said electrode portion and adapted to cooperate with a supply busbar to supply said electrode and to act as a fulcrum for said gun; and a control means embodied in said actuating portion of said gun for actuating said plunger to rotate said gun about said busbar and establish a predetermined welding pressure.

EDWARD J. PODANY.